(12) United States Patent
Kriegel

(10) Patent No.: US 7,089,341 B2
(45) Date of Patent: Aug. 8, 2006

(54) METHOD AND APPARATUS FOR SUPPORTING INTERRUPT DEVICES CONFIGURED FOR A PARTICULAR ARCHITECTURE ON A DIFFERENT PLATFORM

(75) Inventor: Jon K. Kriegel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/815,247

(22) Filed: Mar. 31, 2004

(65) Prior Publication Data

US 2005/0228918 A1    Oct. 13, 2005

(51) Int. Cl.
  *G06F 13/24*     (2006.01)
  *G06F 3/00*     (2006.01)
(52) U.S. Cl. .................. 710/266; 710/260; 710/261; 710/262; 710/263
(58) Field of Classification Search ......... 710/260–269
   See application file for complete search history.

(56) References Cited

U.S. PATENT DOCUMENTS

| | | | |
|---|---|---|---|
| 5,727,217 A | | 3/1998 | Young |
| 5,832,279 A | * | 11/1998 | Rostoker et al. ............ 710/266 |
| 5,857,090 A | | 1/1999 | Davis et al. |
| 5,987,538 A | * | 11/1999 | Tavallaei et al. .............. 710/48 |
| 6,000,040 A | * | 12/1999 | Culley et al. .................. 714/31 |
| 6,006,301 A | * | 12/1999 | Tetrick ........................ 710/260 |
| 6,247,091 B1 | | 6/2001 | Lovett |
| 6,253,334 B1 | * | 6/2001 | Amdahl et al. ................. 714/4 |
| 6,339,808 B1 | * | 1/2002 | Hewitt et al. ................ 710/260 |
| 6,449,699 B1 | | 9/2002 | Franke et al. |
| 6,470,408 B1 | * | 10/2002 | Morrison et al. ........... 710/268 |
| 6,671,762 B1 | * | 12/2003 | Soni et al. ................... 710/267 |
| 6,711,643 B1 | * | 3/2004 | Park et al. ................... 710/260 |
| 6,738,847 B1 | * | 5/2004 | Beale et al. ................. 710/260 |
| 6,820,143 B1 | | 11/2004 | Day et al. |
| 6,820,174 B1 | | 11/2004 | Vanderwiel |
| 2004/0117592 A1 | | 6/2004 | Day et al. |
| 2004/0162946 A1 | | 8/2004 | Day et al. |
| 2004/0263519 A1 | | 12/2004 | Andrews et al. |
| 2005/0027914 A1 | * | 2/2005 | Hammalund et al. ........ 710/260 |
| 2006/0085179 A1 | * | 4/2006 | Hack et al. .................... 703/23 |

* cited by examiner

*Primary Examiner*—Rehana Perveen
*Assistant Examiner*—Brian Misiura
(74) *Attorney, Agent, or Firm*—Patterson & Sheridan LLP

(57) ABSTRACT

Method and apparatus for supporting interrupt devices configured for a specific architecture (e.g., APIC-based software and hardware) on a different platform (e.g., a PowerPC platform). One embodiment provides an apparatus for passing interrupts from one or more devices configured for a specific interrupt architecture to one or more processors not designed for the specific interrupt architecture, comprising: an abstraction layer comprising a first plurality of registers conforming to the specific interrupt architecture; and an implementation dependent layer, disposed in communication between the abstraction layer and the one or more processors, comprising a second plurality of registers which correspond to the first plurality of registers, wherein the implementation dependent layer is configured to receive interrupts and forward received interrupts to the one or more processors and to read and write data to the second plurality of registers in response to interrupts processed through the one or more processor.

21 Claims, 2 Drawing Sheets

METHOD AND APPARATUS FOR SUPPORTING INTERRUPT DEVICES CONFIGURED FOR A PARTICULAR ARCHITECTURE ON A DIFFERENT PLATFORM

BACKGROUND OF THE INVENTION

1. Field of the Invention

The present invention generally relates to an interrupt controller for a processor, and more particularly, to an interrupt controller for supporting devices and software configured for a specific interrupt architecture on a processor which is not designed for the specific interrupt architecture.

2. Description of the Related Art

Generally, an interrupt is a signal from a device or a program that causes a processor to stop and determine the next operation to be performed. A processor is typically configured to handle hardware interrupts as well as software interrupts. A hardware interrupt occurs when a hardware device requires a processor to perform a particular operation, for example, when an input/output (I/O) operation is completed, such as reading data from a hard drive. A software interrupt occurs when an application program terminates or requests certain services from the processor.

Several methods are currently being used to pass interrupts (or exceptions) from a given source to a processor or multi-processor bus structure. One typical system used in both personal computing as well as multiprocessor server applications is described by the Advanced Programmable Interrupt Controller (APIC) architecture. In many typical multi-processor computer systems, the APIC interrupt delivery system is used to detect interrupt requests from attached peripheral devices and advise one or more processors to perform the requested services.

FIG. 1 is a block diagram illustrating a multi-processor environment 100 incorporating a conventional APIC architecture. Generally, the multi-processor environment 100 includes a plurality of processors $110_1$ to $110_n$ having local APICs $120_1$ to $120_n$, respectively, an APIC bus 130 and an Input/Output Advanced Programmable Interrupt Controller (IOAPIC) 140. The local APICs $120_1$ to $120_n$ on the processors $110_1$ to $110_n$ are coupled to the IOAPIC 140 through the APIC bus 130. The IOAPIC 140 includes a set of interrupt signal inputs 150, an interrupt redirection table, programmable registers, and a messaging unit for sending and receiving APIC messages over the APIC bus 130. The IOAPIC 140 may be situated in an input/output subsystem and configured to receive interrupt requests 160 from peripheral devices. Upon detecting an interrupt request, the IOAPIC 140 transmits an APIC interrupt message which includes an interrupt vector providing information about the interrupt through the APIC bus 130 to the local APICs $120_1$ to $120_n$. Each of the local APICs $120_1$ to $120_n$ is configured to determine whether an interrupt broadcast on the APIC bus 130 should be accepted. The local APICs $120_1$ to $120_n$ handle all interactions between the respective processors $110_1$ to $110_n$ and the IOAPIC 140.

Because of the popularity of the APIC architecture, various operating system kernel routines, hardware device drivers, and other hardware and software support are readily available utilizing this interrupt scheme. However, the APIC architecture is only compatible with particular processor platforms, such as the Intel® Architecture IA-32 processors, and is not readily reusable in other platforms, such as a PowerPC® processor platform. Thus, various operating system kernel routines, hardware device drivers and other hardware and software support that are based on the APIC architecture are not compatible with systems based on PowerPC platforms.

Therefore, there exists a need for an apparatus and method for supporting APIC-based software and hardware on a PowerPC platform. Particularly, there is a need for an interface system which can communicate interrupts of APIC-based hardware and software to PowerPC processor cores and return, after processing the interrupts, APIC-based information to the APIC-based hardware and software.

SUMMARY OF THE INVENTION

Embodiments of the present invention generally provide method and apparatus for supporting interrupt devices configured for a specific architecture (e.g., APIC-based software and hardware) on a different platform (e.g., a PowerPC platform). In particular, one embodiment of the present invention provides an interface system which can communicate interrupts of APIC-based hardware and software to PowerPC processor cores and return, after processing the interrupts, APIC-based information to the APIC-based hardware and software.

One embodiment provides an apparatus for passing interrupts from one or more devices configured for a specific interrupt architecture to one or more processors not designed for the specific interrupt architecture, comprising: an abstraction layer comprising a first plurality of registers conforming to the specific interrupt architecture; and an implementation dependent layer, disposed in communication between the abstraction layer and the one or more processors, comprising a second plurality of registers which correspond to the first plurality of registers, wherein the implementation dependent layer is configured to receive interrupts and forward received interrupts to the one or more processors and to read and write data to the second plurality of registers in response to interrupts processed through the one or more processor.

Another embodiment provides a method for passing interrupts from one or more devices configured for a specific interrupt architecture to one or more processors not designed for the specific interrupt architecture, comprising: providing an abstraction layer comprising a first plurality of registers conforming to the specific interrupt architecture; providing an implementation dependent layer, disposed in communication between the abstraction layer and the one or more processors, comprising a second plurality of registers which correspond to the first plurality of registers; receiving interrupts and forwarding received interrupts to the one or more processors through the implementation dependent layer; and reading and writing data to the second plurality of registers in response to interrupts processed through the one or more processor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally provide an interrupt controller for supporting devices and software configured for a specific interrupt architecture on a processor not designed for the specific interrupt architecture. One embodiment of the invention provides a hardware interface that mimics the behavior of the APIC architecture register set (observable/controllable by kernel level software) and bridges this behavior to a mechanism which intelligently asserts the external interrupt inputs to the PowerPC core processor(s). The APIC-compliant register set may provide one of two abstract layers of conformance to the formal APIC specification: either full compliance or operational similarity with some minimal set of APIC-like functions. Another aspect of the invention provides for sending inter-processor interrupts between PowerPC processor threads, broadcasting interrupts to all processor threads, and level-sensitive versus edge-triggered configurability, which are elements of APIC interrupt architecture. Yet another aspect of the invention provides portability of the APIC interrupt architecture to PowerPC platforms, with potential portability to other processor platforms. Embodiments of the invention may be utilized by any PowerPC platform developer including, but not exclusive to, game hardware developers, system on chip (SOC) developers, and device driver developers targeting Microsoft Windows family of operating systems, etc.

Figure 1:
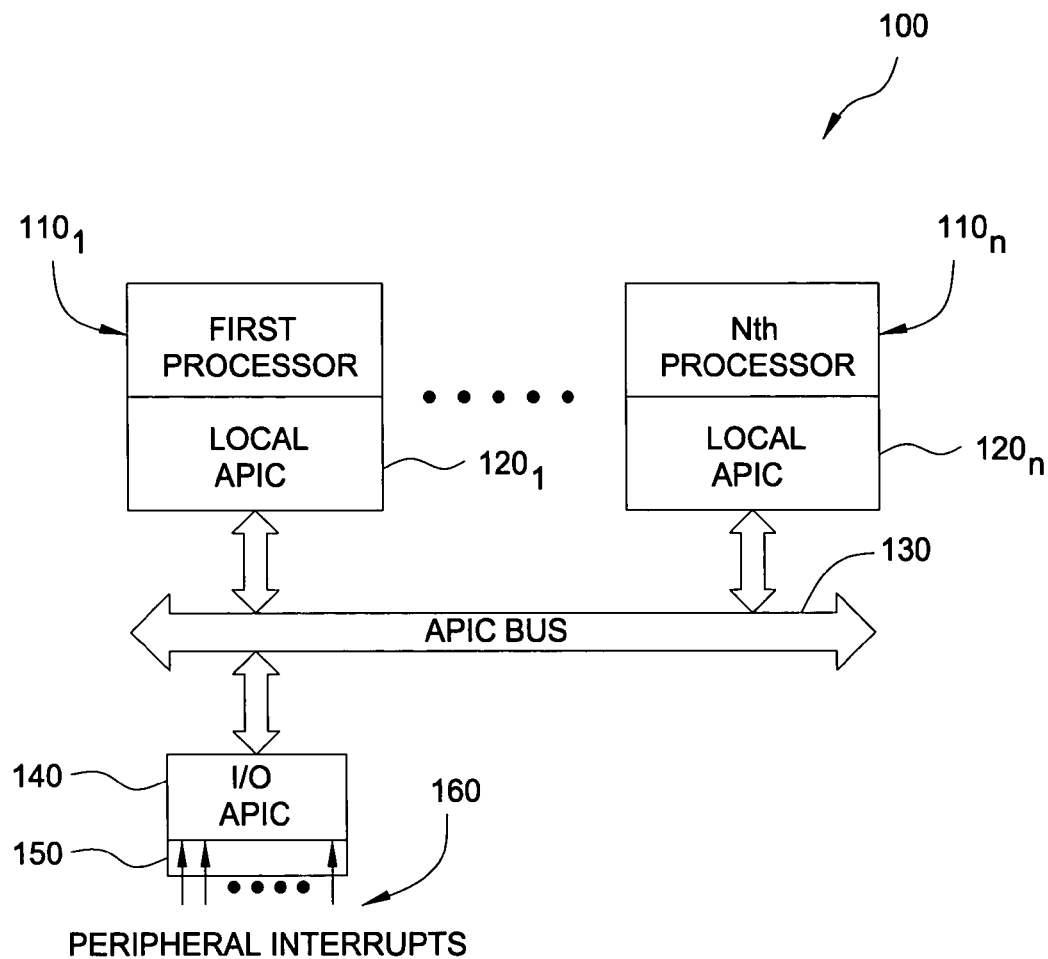
FIG. 1 is a block diagram illustrating a multi-processor environment incorporating a conventional APIC architecture.
Figure 2:
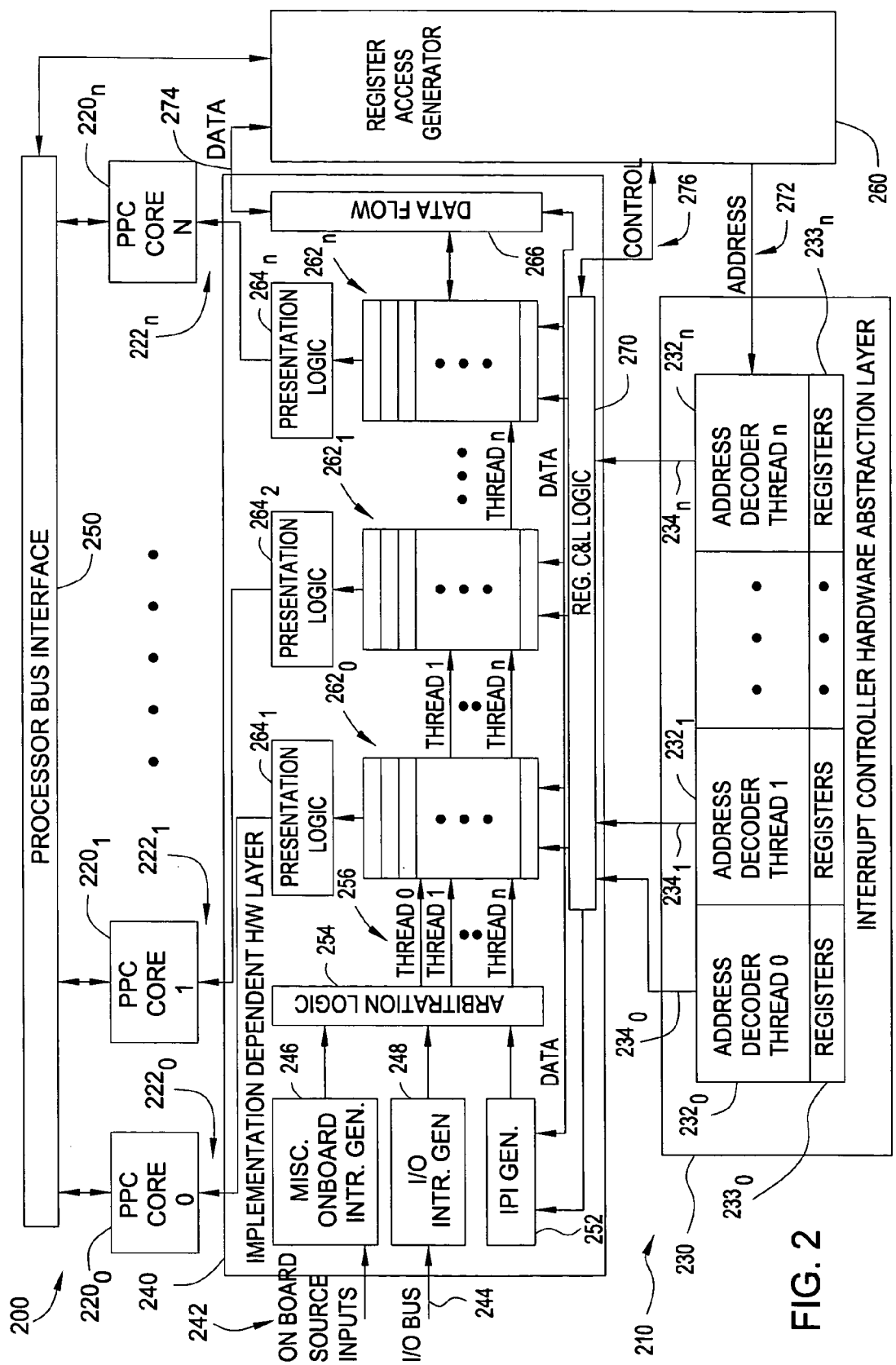
FIG. 2 is a block diagram illustrating a multi-processor environment incorporating an adaptable interrupt controller according to one embodiment of the invention.

FIG. 2 is a block diagram illustrating a multi-processor environment 200 incorporating an adaptable interrupt controller 210 according to one embodiment of the invention. Although embodiments of the invention are described in relation to a multi-processor environment, embodiments usable in single processor environments and multi-thread environments are contemplated. Generally, the multi-processor environment 200 includes an adaptable interrupt controller 210 connected to a plurality of processor cores $220_0$ to $220_n$. The adaptable controller 210 provides a mechanism for passing interrupts from one or more devices and software configured for a specific interrupt architecture (e.g., APIC architecture) to one or more processor cores which are not designed for the specific interrupt architecture. The adaptable interrupt controller 210 includes an interrupt controller hardware abstraction layer 230 and an implementation dependent hardware layer 240. Each processor core 220 includes an input 222 (e.g., an external interrupt pin) for receiving interrupts. The implementation dependent hardware layer 240 communicates with the processor cores $220_0$ to $220_n$ through the inputs $222_0$ to $222_n$. A processor bus interface 250 provides a communication mechanism connected to the processor cores $220_0$ to $220_n$ for communicating with a register access generator 260. The processor bus interface 250 may be utilized to communicate register accesses from the processor cores $220_0$ to $220_n$ to the register access generator 260. In addition to communicating with the processor cores $220_0$ to $220_n$ through the processor bus interface 250, the register access generator 260 communicates with both the interrupt controller hardware abstraction layer 230 as well as the implementation dependent hardware layer 240 to facilitate processing of interrupts and updating appropriate registers.

The interrupt controller hardware abstraction layer 230 may comprise a plurality of address decoders $232_0$ to $232_n$ on a thread or a core basis (i.e., the number of address decoders corresponds to the number of threads or cores). The address decoders (or address decode logic) $232_0$ to $232_n$ receive the address accesses from the register access generator 260 and decode the addresses required for performing a particular operation. The address decoders $232_0$ to $232_n$ may react to address accesses that software embeds in their code as if an APIC-compliant controller were there, and thus, the address decoders $232_0$ to $232_n$ basically mimic the front end of an APIC-compliant controller.

In one embodiment, each of the address decoders $232_0$ to $232_n$ includes a register set $233_0$ to $233_n$ which emulate the register set of a specific interrupt architecture (e.g., APIC architecture). For the embodiment shown in FIG. 2, the interrupt controller hardware abstraction layer 230 emulates the image that an APIC-compliant interrupt controller presents, and each address decoder $232_0$ to $232_n$ includes a set of fully compliant APIC registers, like AID (APIC ID), TMR (Trigger Mode), etc. Alternatively, each address decoder may include a subset of fully compliant APIC registers, depending on the intended of use of the system (i.e., eliminating one or more (non-essential) registers) and still provide operational similarity to an APIC-compliant interrupt controller.

The interrupt controller hardware abstraction layer 230 provides a set of register decode addresses for each thread that react to the address bus 272 coming from the register access generator 260. In response to the signals from the address bus 272 from the register access generator 260, the address decoders $232_0$ to $232_n$ provide decodes $234_0$ to $234_n$ (labeled as address decodes for APIC-compliant registers) to the register control logic block 270 in the implementation dependent hardware layer 240.

In one embodiment, the implementation dependent hardware layer 240 may comprise hardware macros, reusable cores and circuitry specifically designed for interfacing between the processor cores $220_0$ to $220_n$ and the interrupt controller hardware abstraction layer 230. The implementation dependent hardware layer 240 includes inputs for various on-board interrupts 242 as well as inputs for various off-board interrupts 244, such as input/output device interrupt signals. A miscellaneous on-board interrupt generation logic block 246 may be utilized to receive and process various on-board interrupts. The miscellaneous on-board interrupt generation logic block 246 may receive interrupts from on-board sources on the chip, for example, from reliability or error detection registers, row address strobe (RAS), counter interrupt, etc. An I/O interrupt generation logic block 248 may be utilized to receive and process various I/O interrupts from an I/O bus connected to a plurality of I/O or peripheral devices. The implementation dependent hardware layer 240 may further include an inter-processor interrupt generation logic block 252 for receiving and processing interrupts produced by one of the processors and directed to another of the processors. The inter-processor interrupt generation logic block 252 may handle software generated interrupts from one processor core targeting one or more other processor cores. For example, a software write to a register may cause the IPI generation logic block 252 to insert an interrupt into the system.

The interrupt generation logic blocks 246, 248 and 252 process the received respective interrupt requests and forwards the processed signals to an arbitration logic block 254. The arbitration logic block 254 contains decode and/or masking logic mechanism to determine the source of the interrupt and the targeted processor or processors. A generalized control bus 256 may be connected between the arbitration logic 254 and a plurality of thread specific register stacks $262_0$ to $262_n$ to forward interrupts to appropriate thread specific register stacks $262_0$ to $262_n$ and corresponding processor cores $220_0$ to $220_n$.

Each thread specific register stack 262 includes a set of registers that provide one-to-one correspondence to address decode registers in the address decoders 232 of the interrupt controller hardware abstraction layer 230. For example, for the AID (APIC identification) register of the APIC architecture, an implementation specific version of AID register may be provided in each of the thread specific register stacks $262_0$ to $262_n$. The address decode registers may be presented correspondingly in the thread specific register stacks $262_0$ to $262_n$ on a thread-by-thread basis. The thread specific register stacks $262_0$ to $262_n$ may be uniquely selected for an implementation depending on the intended usage of the system.

The generalized control bus 256 facilitates transfer of control signals from the arbitration logic block 254 to the thread specific register stacks $262_0$ to $262_n$. For example, the arbitration logic block 254 may determine that an interrupt came in from an I/O source and is targeted for threads 0, 1 and 3, and send control signals through the generalized control bus 256 (e.g., through bus lines corresponding to threads 0, 1 and 3) to respective thread specific register stacks $262_0$, $262_1$ and $262_3$.

A presentation logic block $264_0$ to $264_n$ is connected to each thread specific register stacks $262_0$ to $262_n$. The presentation logic blocks $264_0$ to $264_n$ comprise logic/circuits for examining the contents of the thread specific register stacks $262_0$ to $262_n$ and deciding whether to drive the external interrupt lines $222_0$ to $222_n$ of respective processor cores $220_0$ to $220_n$.

The implementation dependent hardware layer 240 includes a data flow block 266 which facilitates reading and writing data 274 from the register access generator 260 to the thread specific register stacks $264_0$ to $264_n$. The data flow block 266 is connected to each thread specific register stacks $264_0$ to $264_n$. The data flow block 266 is also connected to the IPI generation block 252 to facilitate reading and writing of data as required by the inter-processor interrupts.

The implementation dependent hardware layer 240 includes a register control logic block 270 which is connected to the register access generator 260 and the address decoders $232_0$ to $232_n$ in the interrupt controller hardware abstraction layer 230. In one embodiment, the register control logic block 270 receives the address decodes $234_0$ to $234_n$ from the address decoders $232_0$ to $232_n$ along with the register control signals 276 from the register access generator 260 to control the updates and read/write functions to the thread specific register stacks $264_0$ to $264_n$.

In operation, the interrupt processing through the multi-processor environment 200 begins with a source of interrupts (i.e., the I/O channel, the miscellaneous onboard sources, or a processor) injecting an interrupt into the system. Typically, the interrupt transaction will contain some information associated with the source, destination, and priority of the interrupt. For example, when an I/O channel interrupt enters the system, the I/O channel interrupt is captured by the I/O interrupt generation logic 248, where the destination processor and source priority are determined. Then, the I/O channel interrupt is presented to the arbitration logic 254. Once the arbitration logic 254 selects this interrupt source for processing, the information contained in the interrupt is decoded and one or more target thread specific register stacks $262_n$ may be selected to be updated with this information. The state of the thread specific register stack is updated, and the interrupt presentation logic $264_n$ for the applicable processor(s) determines whether the external interrupt line $222_n$ should be asserted to the PPC core thread $220_n$. Once the external interrupt line is asserted, the core internal interrupt handling logic of the PPC core will conditionally force exception processing to occur. This typically involves saving current machine state and forcing program execution to jump to an interrupt service routine (ISR). Once in the ISR, the ISR program typically interrogates the system to determine the source of the interrupt by reading information in the thread specific register stack (via the interrupt controller abstraction layer 230 and the implementation dependent hardware layer 240) and/or other sources. Then the interrupt is processed, and the requested operations are performed by the processor. After completing the interrupt request, the thread specific register stack may be updated if necessary, and the source of the interrupt is then re-enabled. The interrupt processing sequence described above is similarly performed for the interrupts from each source of interrupts.

While the foregoing is directed to embodiments of the present invention, other and further embodiments of the invention may be devised without departing from the basic scope thereof, and the scope thereof is determined by the claims that follow.

What is claimed is:

1. An apparatus for passing interrupts from one or more devices configured for a specific interrupt architecture to one or more processors not designed for the specific interrupt architecture, comprising:
   an abstraction layer comprising a first plurality of registers conforming to the specific interrupt architecture; and
   an implementation dependent hardware layer, disposed in communication between the abstraction layer and the one or more processors, comprising a second plurality of registers which correspond to the first plurality of registers, wherein the implementation dependent layer is configured to receive interrupts and forward received interrupts to the one or more processors which are not designed for the specific interrupt architecture and to read and write data to the second plurality of registers in response to interrupts processed through the one or more processors.

2. The apparatus of claim 1, further comprising a register access generator connected to provide data and control signals to the implementation dependent layer and to provide address accesses to the abstraction layer.

3. The apparatus of claim 2, further comprising a processor bus interface connected to provide communication between the register access generator and the one or more processors.

4. The apparatus of claim 3, wherein the implementation dependent hardware layer further comprises an arbitration logic circuit for determining a source of an interrupt and a targeted processor.

5. The apparatus of claim 4, wherein the arbitration logic circuit is connected to an on-board interrupt generation logic circuit, an input/output interrupt generation logic circuit and an inter-processor interrupt generation logic circuit.

6. The apparatus of claim 5, wherein the implementation dependent hardware layer further comprises a register control logic circuit for controlling data read and write functions to the second plurality of registers, the register control logic circuit configured to receive control signals from the register access generator and address decodes from one or more address decoders in the abstraction layer.

7. The apparatus of claim 6, wherein the implementation dependent hardware layer further comprises one or more presentation logic circuit connected respectively to external interrupt inputs of the one or more processors.

8. The apparatus of claim 1, wherein the specific interrupt architecture is an Advanced Programmable Interrupt Controller (APIC) architecture.

9. The apparatus of claim 8, wherein the first plurality of registers comprises one or more register sets in full compliance with the APIC architecture.

10. The apparatus of claim 8, wherein the first plurality of registers comprises one or more register sets which provide operational similarity with the APIC architecture.

11. The apparatus of claim 8, wherein the one or more processors are PowerPC processors.

12. A method for passing interrupts from one or more devices configured for a specific interrupt architecture to one or more processors not designed for the specific interrupt architecture, comprising:
   providing an abstraction layer comprising a first plurality of registers conforming to the specific interrupt architecture;
   providing an implementation dependent layer, disposed in communication between the abstraction layer and the one or more processors, comprising a second plurality of registers which correspond to the first plurality of registers;
   receiving interrupts and forwarding received interrupts to the one or more processors which are not designed for the specific interrupt architecture through the implementation dependent layer; and
   reading and writing data to the second plurality of registers in response to interrupts processed through the one or more processor.

13. The method of claim 12, further comprising providing a register access generator connected to provide data and control signals to the implementation dependent layer and to provide address accesses to the abstraction layer.

14. The method of claim 12, wherein the specific interrupt architecture is an Advanced Programmable Interrupt Controller (APIC) architecture and the one or more processors are PowerPC processors.

15. An apparatus for passing interrupts from one or more devices configured for a specific interrupt architecture to one or more processors not designed for the specific interrupt architecture, comprising:
   an abstraction layer comprising a plurality of address decoders and a first plurality of registers conforming to the specific interrupt architecture;
   an implementation dependent layer, disposed in communication between the abstraction layer and the one or more processors, comprising a second plurality of registers which correspond to the first plurality of registers, wherein the implementation dependent layer is configured to receive interrupts and forward received interrupts to the one or more processors and to read and write data to the second plurality of registers in response to interrupts processed through the one or more processor; and
   a register access generator, disposed in communication with the one or more processors, configured to provide data and control signals to the implementation dependent layer and to provide address accesses to the abstraction layer.

16. The apparatus of claim 15, further comprising a processor bus interface to provide communication between the register access generator and the one or more processors.

17. The apparatus of claim 15, wherein the implementation dependent hardware layer further comprises:
   an arbitration logic circuit for determining a source of an interrupt and a targeted processor;
   a register control logic circuit for controlling data read and write functions to the second plurality of registers, the register control logic circuit configured to receive control signals from the register access generator and address decodes from one or more address decoders in the abstraction layer; and
   one or more presentation logic circuit connected respectively to external interrupt inputs of the one or more processors.

18. The apparatus of claim 17, wherein the arbitration logic circuit is connected to an on-board interrupt generation logic circuit, an input/output interrupt generation logic circuit and an inter-processor interrupt generation logic circuit.

19. The apparatus of claim 15, wherein the specific interrupt architecture is an Advanced Programmable Interrupt Controller (APIC) architecture and the one or more processors are PowerPC processors.

20. The apparatus of claim 19, wherein the first plurality of registers comprises one or more register sets in full compliance with the APIC architecture.

21. The apparatus of claim 19, wherein the first plurality of registers comprises one or more register sets which provide operational similarity with the APIC architecture.

* * * * *